United States Patent [19]

Reid

[11] Patent Number: 4,917,805

[45] Date of Patent: Apr. 17, 1990

[54] CYCLICAL COMPLETE MIX ACTIVATED SLUDGE PROCESS

[76] Inventor: John H. Reid, 6 River Oak Pl., Fredericksburg, Va. 22401

[21] Appl. No.: 286,805

[22] Filed: Dec. 20, 1988

[51] Int. Cl.$^4$ .................................................. C02F 3/30
[52] U.S. Cl. ..................................... 210/605; 210/628; 210/630; 210/903
[58] Field of Search ............... 210/605, 624, 626, 628, 210/630, 903

[56] References Cited

U.S. PATENT DOCUMENTS

| | | | |
|---|---|---|---|
| 3,342,727 | 9/1967 | Bringle | 210/626 |
| 4,618,426 | 10/1986 | Mandt | 210/626 |
| 4,655,925 | 4/1987 | Tabata et al. | 210/628 |

FOREIGN PATENT DOCUMENTS

| | | |
|---|---|---|
| 3427310 | 2/1985 | Fed. Rep. of Germany . |
| 53-92551 | 8/1978 | Japan . |
| 54-125861 | 9/1979 | Japan . |
| 55-35964 | 3/1980 | Japan . |
| 56-95396 | 8/1981 | Japan . |
| 57-110397 | 7/1982 | Japan . |
| 60-19097 | 1/1985 | Japan . |
| 61-54296 | 3/1986 | Japan . |

Primary Examiner—Peter Hruskoci
Assistant Examiner—Christopher Upton
Attorney, Agent, or Firm—Marion P. Lelong

[57] ABSTRACT

A nitrification-denitrification process is disclosed wherein a single flow-through and cyclically operated complete mix activated sludge basin, containing mixed liquor having a mean cell residence time of at least 15 days, is fed with wastewater and discharges treated wastewater to a clarifier while its contents are continuously agitated and cyclically aerated for approximately 3–9 minutes to form an oxic stage and then not aerated for approximately 3–9 minutes to form an anoxic stage. The treated and clarified liquor has ammonia contents no higher than 2.0 mg/l, nitrite contents no higher than 1.0 mg/l, and nitrate contents no higher than 2.0 mg/l. Approximately 99.9% by weight of the discharged sludge from the clarifier is returned to the complete mix basin, the remainder being waste activated sludge.

3 Claims, 2 Drawing Sheets

CYCLICAL COMPLETE MIX ACTIVATED SLUDGE PROCESS

BACKGROUND OF THE INVENTION

1. Field of the Invention

This invention relates to treatment of wastewaters by the compete mix activated sludge process and particularly relates to utilization of this process in a single tank or basin for nitrification of ammonia in the wastewaters and denitrification of the nitrites and/or nitrates formed therefrom.

2. Review of the Prior Art

Complete mix systems are designed so that if samples are taken simultaneously over the basin area, the measured properties are essentially uniform. As one of these properties, the dissolved-oxygen content (D.O.) is maintained as uniformly as possible at an average dissolved-oxygen content of 2.0 mg of $O_2/l$. In practice, the D.O. concentration is usually not uniform because higher D.O. concentrations are found closer to the aerators and to the liquid surface (particularly if surface aerators are used) and because lower D.O. concentrations are found near the sides and the bottom of the basin.

Complete mixing is commonly conducted in round, square, or rectangular tanks or basins into which incoming wastes are fed at numerous places. The contents of the basins are sufficiently mixed to insure that the incoming wastes are rapidly dispersed throughout the basins, in contrast to plug-flow systems. The volume of mixed liquor in a basin is so much greater than the volume of the incoming wastewater that the wastewater is overwhelmingly dominated by the basin contents. Thus there is a relatively uniform food/microorganism ratio existing in such complete-mix basins. Also, there is a uniform concentration of mixed liquor-suspended solids (MLSS) to be found in complete mix aeration basins, as contrasted with the variable concentration noted in the plug-flow and semi-plug flow tanks.

It should be understood that the mixed liquor in a complete mix activated sludge basin does not flow translationally, as in a smoothly flowing river or an oxidation ditch. Instead, it moves onward very slowly, the hydraulic retention time within the basin typically being 12–60 hours, depending upon the strength of the incoming wastewater and the treatment requirements. However, it is not stagnant because the mixing devices move the liquor vertically, horizontally, and radially. A toroidal flow pattern around each mixing device is indeed a common occurrence so that each particle of mixed liquor is exposed repeatedly but randomly to contact with oxygen while the aerators are in operation.

Ammonia, derived from decomposition of proteins, is present in many wastewaters as a contaminant that must be removed. The mixture of microorganisms that exists in a barrier oxidation ditch is very well suited for such removal by ammonia oxidation to nitrite with Nitrosomas (e.g., *Nitrosomas europea*), oxidation of nitrite to nitrate with Nitrobacter (e.g., *Nitrobacter winnogradski* and *Nitrobacter agilis*) and denitrification by reduction of the nitrite and/or nitrate to nitrogen gas with facultative heterotrophic microorganisms generally of the genera of Pseudomonas, Achromobacter, Bacillus, and Micrococcus. All of these microorganisms are ubiquitous in the environment. Both Nitrosomas and Nitrobacter require a dissolved oxygen level in excess of approximately 0.5 mg/l and preferably greater than 1.0 mg/l.

A barrier oxidation ditch of such nitrification/denitrification capability operates on approximately a 6–18 minute cycle and contains microorganisms having a long sludge age or mean cell residence time (MCRT).

It would be highly desirable to be able to utilize such short cycle times in a complete mix activated sludge system (CMAS System). However, it is contrary to established practice to provide closely timed, brief periods of aerated mixing and nonaerated mixing in order to emulate an oxidation ditch. In consequence, most attempts to accomplish cyclical oxic-anoxic CMAS basin operation and resulting nitrification-denitrification are believed to have utilized fill-and-draw sequence batch reactors.

Because the autotrophic microorganisms such as Nitrosomas and Nitrobacter grow much more slowly, for example, on the order of five to ten times more slowly, than the facultative heterotrophic microorganisms, an acclimation period of up to one to three months may be necessary, although maintaining a pH and temperature just below the maximum and a D.O. level just above the minimum can minimize this period.

As an example of processes adapted to cope with such differences in bacterial growth rates, the nitrification process disclosed in U.S. Pat. No. 4,705,633 increases the efficiency of nitrification by increasing the population of nitrifying bacteria beyond that which would naturally occur in a nitrifying activated sludge system by using a return sludge reaeration zone which is enriched with anhydrous ammonia or an aqueous solution thereof.

The process of U.S. Pat. No. 4,537,682 controls the microorganism population by controlling the sludge wastage rate, hydraulic residence time, dissolved oxygen level, sludge mixing rate, biological oxygen demand, pH, and temperature for high-strength ammonia-containing wastewaters, possibly containing other contaminants such as phenolic, cyanide, and thiocyanide compounds, in order to nitrify and denitrify in a single reactor. Although it is true that this process is directed to the unusually difficult problem of treating high-strength industrial wastewaters, its seven areas of testing and control impose an onerous burden on a plant operator. Simpler methods of control, particularly for sanitary wastewaters and for wastewaters from food processing plants, are accordingly needed.

Other denitrifying methods also seek to remove phosphorus, as exemplified by U.S. Pat. No. 4,655,925 which discloses a method of removing nitrogen and phosphorus from wastewater by using a mixed liquor comprising the wastewater and activated sludge within a single basin in which are aerating and mixing devices which cannot independently maintain a fixed mixing rate while selectively varying the oxygen transfer rate. This limitation occurs because the aerating and mixing devices described in U.S. Pat. No. 4,655,925 use jet aeration units which provide adequate mixing and oxygen transfer during aerobic cycles but which lose mixing effectiveness during anoxic and anaerobic cycles in which the jet header unit pumps continue to be operated while the air flow to the jet pumps is discontinued. Under these conditions, it is well known that jet pumps do not mix as well as when they operate with both pumps and compressed air supply running.

An even more important consequence is that turning off air to the jets inherently decreases the mixing rate and decreases the mixing brake horsepower per unit volume of the basin. What is accordingly needed is a mixing device that has independent control of both aeration and mixing, provides fully effective mixing, and does not lose its mixing power input when aeration input is changed.

In the method of U.S. Pat. No. 4,655,925, a cycle consisting of an agitating step and an aerating step is repeated at least two times, and each cycle is finished within two hours, with the ratio of the agitating time to the aerating time being between one to one and five to one. In the agitating step, the mixed liquor is in an anoxic condition and in a succeeding anaerobic condition. Denitrification occurs in the anoxic condition, and the aerobic bacteria release phosphorus in the anaerobic condition. During the aerating step, nitrification occurs while the bacteria excessively ingest phosphorus from the mixed liquor.

However, in attempting to accomplish biological phosphorus removal by a process that includes an anaerobic cycle in which the microorganisms release phosphates to the wastewater and an aerobic cycle in which there is luxury uptake of phosphorus, it is extremely important not to have excessive sludge age in order to prevent cell breakdown and phosphorus release back to the wastewater liquid, resulting in increased effluent phosphorus concentrations. If a long sludge age is allowed to occur in the reactor, then more endogenous respiration will also occur, resulting in cell breakdown and release of stored phosphorus into the wastewater liquid so that there is increased effluent phosphorus concentration.

The cyclical activated sludge process disclosed in U.S. Pat. No. 4,655,925 must therefore be limited to short Mean Cell Residence Times (MCRT's) in order to accomplish high efficiency biological phosphorus removal. If high efficiency biological phosphorus removal is attempted through very accurate control of MCRT but at relatively low levels of MCRT in order to avoid difficulties with endogenous respiration and cell breakdown, it can become very difficult to attain a high enough MCRT to accomplish biological denitrification during the winter season. A cyclical CMAS process for a single basin that relates to nitrification and denitrification only is accordingly needed.

SUMMARY OF THE INVENTION

It is therefore an object of this invention to provide a cyclical complete mix activated sludge process utilizing long MCRT's for nitrification and denitrification of wastewaters containing ammonia.

It is another object to use aerating and mixing devices in a CMAS reactor basin which allow for the oxygen transfer rate and the mixing rate to be independently controlled.

It is an additional object to provide a process utilizing aerating and mixing devices that provide a steady power input of over 30 horsepower per million gallons for continuous mixing of the complete mix basin contents.

It is a further object to provide a process which replicates the brief aerobic/anoxic cycles of a Total Barrier Oxidation Ditch for effecting nitrification and denitrification of ammonia-containing wastewater within the basin.

In accordance with these objects and the principles of this invention, it has been discovered that a continuous flow-through complete mix activated sludge (CMAS) basin can be operated to accomplish high efficiency nitrogen removal through biological nitrification-denitrification by cycling oxygen supply and transfer in brief on-off cycles while maintaining continuous mixing in the CMAS basin.

This process avoids the necessity of attempting to operate the CMAS basin as a fill-and-draw sequence batch reactor in order to accomplish cyclical oxic-anoxic CMAS basin operation and resulting nitrification-denitrification.

The CMAS basin can be aerated and mixed by diffused aeration or subsuface aeration devices which are combined with separate floating or fixed platform mixers that operate independently. The on-off cycles of oxygen transfer must be regulated in order to produce a cycling oxic-anoxic or high and low dissolved oxygen (D.O.) condition in the complete mix basin with cycle times that correspond closely to those that are generated in a Total Barrier Oxidation Ditch nitrification-denitrification process.

In a typical barrier oxidation ditch, the total circuit time of one loop is approximately ten minutes with approximately half of the ten-minute cycle time being in an aerobic condition and the other half in an anoxic condition. In a cyclical complete mix activated sludge basin which is operated according to the process of this invention, the mixed liquor is cycled between oxic and anoxic conditions on a 6-to-18-minute cycle time basis, so that during approximately half of the cycle time, or 3–9 minutes, it is in anoxic condition and during the other half it is in oxic condition.

The oxic and anoxic cycle times can consequently be regulated independently of the reactor volume and total reactor circuit loop time, accomplishments which are not possible in a Total Barrier Oxidation Ditch or in other types of closed loop reactor oxidation ditch systems.

The preferred method of providing continuous mixing and cyclical aeration in this Cyclical CMAS Process is to utilize coarse or fine bubble diffused aerators on the bottom of the reactor basin which operate in combination with floating surface mixers installed at the liquid surface in the aeration basin or to utilize floating draft tube induction aerators on the surface of the reactor basin that can provide continuous mixing and independent cyclical oxygen transfer.

The advantage of utilizing floating induction draft tube aerators is that the purchase and installation of air supply blowers and diffusers is not necessary for providing cyclical oxygen transfer because it is then possible to regulate oxygen transfer cycles by simply opening the air supply induction line valve when oxygen transfer is required and closing the valve when mixing without oxygen transfer is required.

DESCRIPTION OF THE PREFERRED EMBODIMENTS

Figure 1:
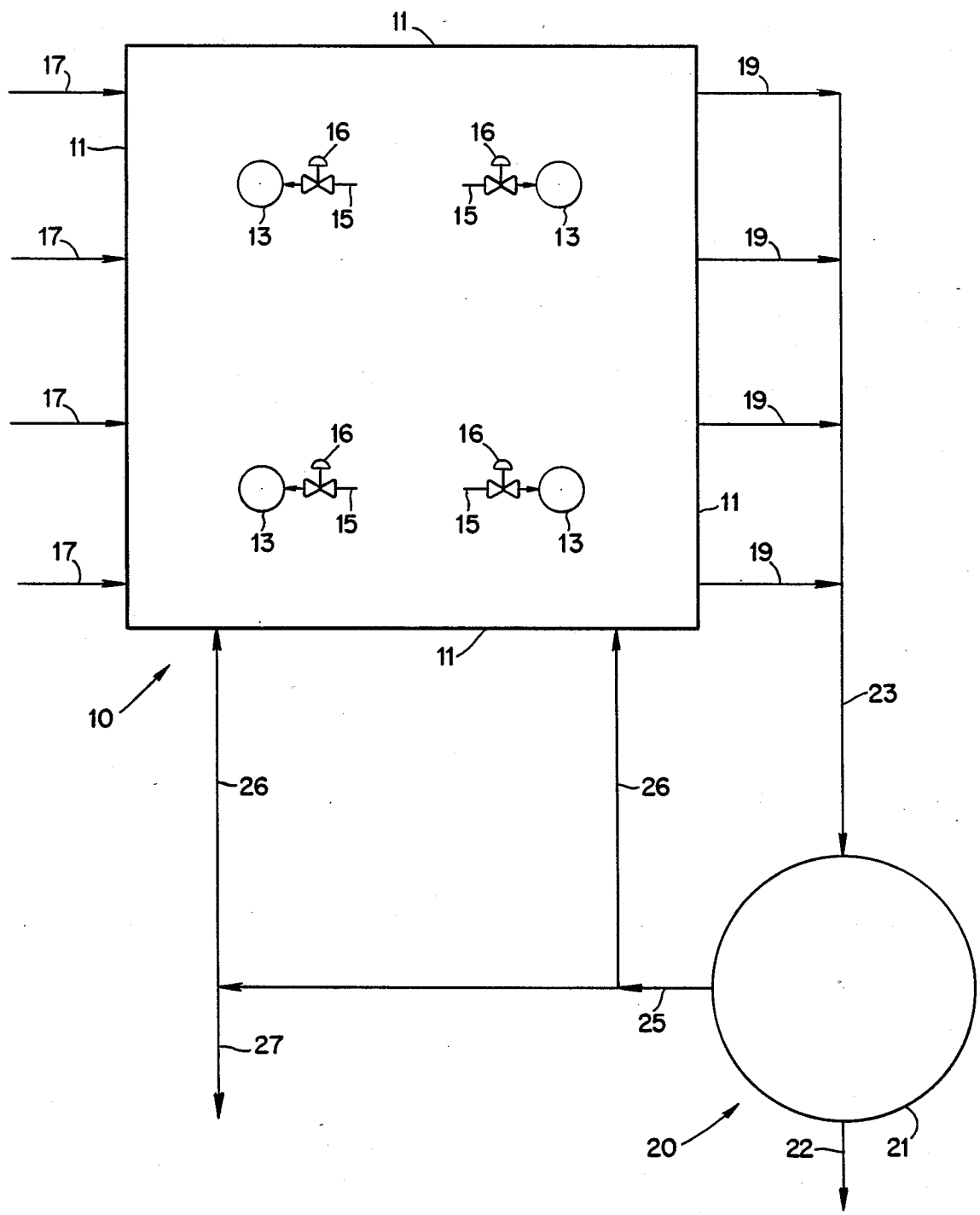
FIG. 1 is a plan view of a typical flow-through and cyclically operated CMAS system of square shape, having four floating induction draft tube aerators.

As shown in FIG. 1, flow-through complete mix activated sludge basin 10 has four equal sides 11 and contains four floating induction draft tube aerators 13 which are fed with air through lines 15 which are individually controlled by valves 16. As the simplest embodiment, ammonia-contaminated wastewater is fed to basin 10 through lines 17 on one side of basin 10, is mixed with the contents of the basin and with return sludge entering through lines 26, and is discharged as treated mixed liquor through lines 19 from the other side of basin 10 after nitrification and denitrification. This treated mixed liquor is collected in line 23 and fed to clarifier 20 having circular side 21. Clarified liquor is discharged through line 22 to a lake or river, for example, and settled sludge is discharged through line 25, a portion being fed to basin 10 as return sludge through lines 26 and the remaining portion being removed from the system through line 27 as waste activated sludge.

When valves 16 are opened by the operator or, preferably, by automatically programmed cycle timers, the mixed liquor is both aerated and mixed for approximately 3 to 9 minutes, depending upon ambient temperature and water temperature, to create the oxic portion of the cycle. When valves 16 are closed, the mixed liquor is mixed without aeration for another 3 to 9 minutes, creating the anoxic portion of the cycle.

EXAMPLE 1

On a daily basis, 1,000,000 gallons of wastewater from a poultry slaughtering plant is fed to a float cell, which removes fats and prteins as float sludge, and is then fed to one side of a cyclically operated, flow-through complete mix activated sludge basin containing four floating draft tube induction aerators. The basin has a volume of 2.5 million gallons. The average sludge return rate is 100%. The MCRT is 40 days. The average hydraulic retention time is 60 hours. The wastewater has a BOD of 300 mg/l and an ammonia-nitrogen content of 50 mg/l.

The basin is operated on a cyclical basis of five minutes with mixing and aeration and five minutes with mixing only from the floating draft tube aerators. The mixed liquor is discharged from the other side of the basin and fed to a clarifier having a capacity of 650,000 gallons. Clarified liquor, having an ammonia content of 1.0 mg/l, a nitrite content of 0.3 mg/l, and a nitrate content of 2.0 mg/l, and settled sludge are discharged from the clarifier. The sludge has a solids content of 0.8 weight per cent, and 99.9% by weight of this discharged sludge is returned to the basin, the remainder being disposed of as waste activated sludge.

Figure 2:
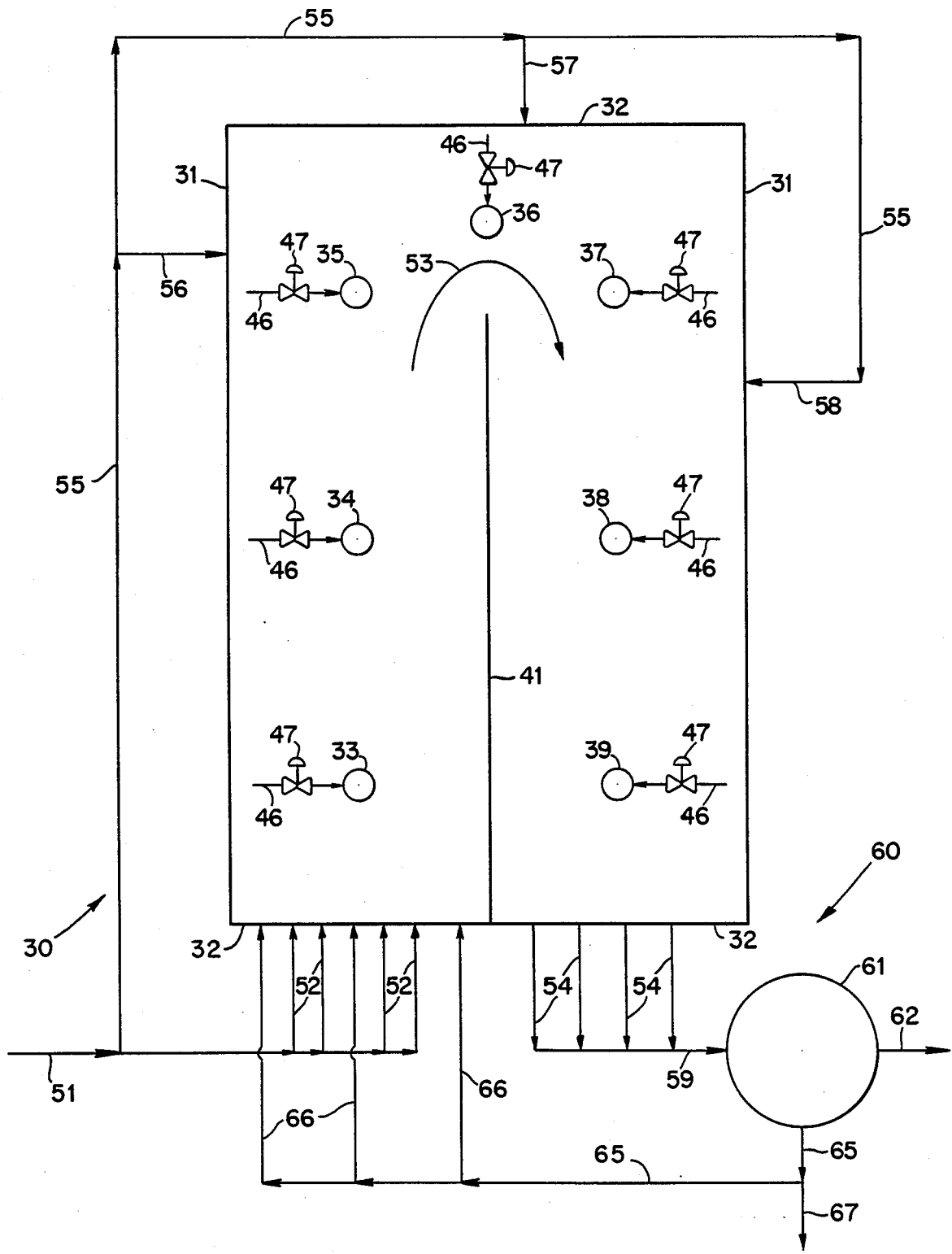
FIG. 2 is a plan view of another flow-though and cyclically operated CMAS system of rectangular shape which has seven aerators and a longitudinally disposed baffle.

As shown in FIG. 2, flow-through complete mix activated sludge basin 30 has two long sides 31, two short sides 32, inner barrier 41, and seven aerator/mixers 33, 34, 35, 36, 37, 38, 39. These aerator/mixers are fed with air through unit lines 46 to the individual aerator/mixers 33-39. Individually programmable control valves 47 on each line 46 make it possible to impart any reasonable degree of mixing and/or oxic/anoxic cycling that is desired to the incoming ammonia-contaminated wastewater in supply line 51 which enters basin 30 through feed lines 52 and, additionally, through branch supply line 55 and organic carbon feed lines 56, 57, 58 which are utilized only after sufficient nitrification has occurred, when the microorganisms begin to need a carbon source that will accept electrons. As is well known, the organic carbon in the wastewater is able to do so.

The raw incoming wastewater in lines 52 thereby moves in succession past mixers 33 and 34 and mixer/aerator 35, swings around the far end of barrier 41 as flow 53 while being subjected to the action of mixer/aerator 36, and then passes mixer/aerators 37 and 38 before a final mix by unit 39 and leaving basin 30 through discharge lines 54 and collecting line 59 for feeding to clarifier 60 having side 61.

Settled liquor, containing less than specification amounts of total nitrogen, nitrite, and nitrate, is discharged through line 62 to a lake or river, for example, after sterilization, and settled sludge is discharged through line 65 and fed to the inlet end of basin 30 through lines 66, a minor portion being discharged as waste activated sludge through line 67.

This embodiment of the invention offers a more prolonged sequence of treatment than the embodiment of FIG. 1. In consequence, individually programmable control devices 47 enable a greater range of variations in the air input cycle to be made. If, for example, the Nitrosomas population is low or is slow acting (possibly because of a sudden temperature drop), mixer/aerators 34 and 35 can be placed on a 100% or perhaps 90% aeration program, mixer/aerator 36 can be changed to a 75/25 aerobic/anoxic schedule, and the units 37, 38, 39 can be placed on a 50:50 aerobic/anoxic schedule as mixer/aerators.

EXAMPLE 2

On a daily basis, 1,000,000 gallons of wastewater from a poultry slaughtering plant are fed to a float cell, which removes fats and proteins as float sludge, and is then fed to the inlet of a cyclically operated, flow-through complete mix activated sludge basin containing seven floating draft tube induction aerators. The basin has a volume of 3.0 million gallons. The average sludge return rate is approximately 100%. The MCRT is 48 days. The average hydraulic retention time is 72 hours. The wastewater has a BOD of 300 mg/l and an ammonia-nitrogen content of 50 mg/l.

The basin is operated on a cyclical basis of five minutes with mixing and aeration and five minutes with mixing only from the floating draft tube aerators. The mixed liquor is discharged at the other end of the basin and fed to a clarifier having a capacity of 750,000 gallons.

Clarified liquor, having an ammonia content of 1.0 mg/l, a nitrite content of 0.2 mg/l, and a nitrate content of 1.8 mg/l, is discharged to a large river after sterilization, and settled sludge, having a solids content of 0.8%, is discharged from the clarifier, 99.9% by weight being returned to the basin as return sludge, the remainder being disposed of as waste activated sludge.

What is claimed is:

1. A process for nitrification and denitrification of ammonia-contaminated wastewater, comprising:
   A. continuously feeding said wastewater to a single flow-through complete mix activated sludge basin with a hydraulic retention time of a minimum of 12 hours, wherein an aeration means is cyclically operated and which contains mixed liquor having a mean cell residence time of at least 15 days;
   B. agitating said mixed liquor while cyclically aerating said mixed liquor for approximately 3–9 minutes to form an oxic stage and withholding aeration for approximately 3–9 minutes to form an anoxic stage, to treat said mixed liquor for discharge from said basin;
   C. continuously withdrawing said treated mixed liquor from said basin; and D. clarifying said treated mixed liquor to obtain activated sludge and treated and clarified liquor, as effluent which has ammonia contents no higher than 2.0 mg/l, nitrite contents no higher than 1.0 mg/l, and nitrate contents no higher than 2.0 mg/l.

2. The process of claim 1, wherein approximately 99.9 per cent by weight of said sludge is returned to said basin, the remainder of said sludge being withdrawn as waste activated sludge.

3. The process of claim 1, wherein said agitating utilizes a fixed power input of at least 30 horsepower per million gallons of said mixed liquor.

* * * * *